(12) United States Patent
Wang et al.

(10) Patent No.: US 10,299,196 B2
(45) Date of Patent: May 21, 2019

(54) NETWORK ACCESS METHOD, TERMINAL AND STORAGE MEDIUM

(71) Applicant: GUANGDONG OPPO MOBILE TELECOMMUNICATIONS CORP., LTD., Dongguang, Guangdong (CN)

(72) Inventors: Xukang Wang, Dongguan (CN); Zhengpeng Tan, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/783,081

(22) Filed: Oct. 13, 2017

(65) Prior Publication Data
US 2018/0227839 A1 Aug. 9, 2018

(30) Foreign Application Priority Data
Feb. 8, 2017 (CN) .......................... 2017 1 0069745

(51) Int. Cl.
*H04W 8/08* (2009.01)
*H04W 48/16* (2009.01)
(Continued)

(52) U.S. Cl.
CPC ............. *H04W 48/16* (2013.01); *H04W 8/08* (2013.01); *H04W 8/22* (2013.01); *H04W 60/00* (2013.01); *H04W 84/042* (2013.01); *H04W 88/02* (2013.01)

(58) Field of Classification Search
CPC ..... H04W 48/16; H04W 48/18; H04W 48/08; H04W 60/04; H04W 72/02; H04W 36/0061; H04W 48/20; H04W 76/02; H04W 76/028; H04W 84/005; H04W 84/12; H04W 8/18; H04W 16/10; H04W 36/08; H04W 48/10
See application file for complete search history.

(56) References Cited

U.S. PATENT DOCUMENTS 9,706,484 B2  7/2017 Swaminathan et al.
2012/0243467 A1* 9/2012 Vallurupalli .......... H04W 48/18
                                                      370/328
(Continued)

FOREIGN PATENT DOCUMENTS

CN      101547499 A    9/2009
CN      101980571 A    2/2011
(Continued)

OTHER PUBLICATIONS

Supplementary European Search Report in European application No. 17193051.4, dated Jan. 4, 2018.
(Continued)

*Primary Examiner* — Kwasi Karikari
(74) *Attorney, Agent, or Firm* — Ladas & Parry LLP (57) ABSTRACT

Disclosed are a network access method, a terminal and a non-transitory processor readable medium. According to the method, a terminal scans frequency points to perform network search. The scanned frequency points are added to a first pre-set list. If the terminal fails in registration under a current Public Land Mobile Network (PLMN), the frequency points stored in the first pre-set list are searched in a next PLMN registration process so as to perform network registration.

13 Claims, 8 Drawing Sheets

(51) Int. Cl.
*H04W 60/00* (2009.01)
*H04W 8/22* (2009.01)
*H04W 88/02* (2009.01)
*H04W 84/04* (2009.01)

(56) References Cited

U.S. PATENT DOCUMENTS

| | | |
|---|---|---|
| 2015/0163726 A1 | 6/2015 | Bansal et al. |
| 2016/0095156 A1* | 3/2016 | Mitra .................. H04W 76/028 370/329 |
| 2016/0309400 A1 | 10/2016 | Swaminathan et al. |
| 2017/0135032 A1 | 5/2017 | Huang et al. |
| 2017/0142648 A1 | 5/2017 | Jiang et al. |

FOREIGN PATENT DOCUMENTS

| | | |
|---|---|---|
| CN | 105307241 A | 2/2016 |
| CN | 105792121 A | 7/2016 |
| CN | 105898839 A | 8/2016 |
| CN | 106162813 A | 11/2016 |
| CN | 106888495 A | 6/2017 |
| EP | 3113545 A1 | 1/2017 |
| EP | 3166359 A1 | 5/2017 |

OTHER PUBLICATIONS

International Search Report in international application No. PCT/CN2017/102902, dated Dec. 26, 2017.
English Translation of the Written Opinion of the International Search Authority in international application No. PCT/CN2017/102902, dated Dec. 26, 2017.

\* cited by examiner

FIG. 8

NETWORK ACCESS METHOD, TERMINAL AND STORAGE MEDIUM

CROSS-REFERENCE TO RELATED APPLICATIONS

This application is based upon and claims priority to Chinese Patent Application No. 201710069745.7, filed on Feb. 8, 2017, the entire contents of which are incorporated herein by reference.

TECHNICAL FIELD

The present disclosure relates to mobile communications, and in particular, to a network access method, a terminal and a non-transitory processor readable medium.

BACKGROUND

With update and development of a wireless communication technology, a $4^{th}$-generation (4G) mobile communication technology emerges. Compared with an original $3^{rd}$-generation (3G) mobile communication technology, the 4G mobile communication technology has the advantages of being able to quickly transmit data, audios, videos, images, etc., and can meet requirements of almost all users for wireless service.

Users are enjoying quick surfing on a 4G network. When terminals are in a weak-signal region or no-signal region and subsequently enter a signal-covered region (e.g., a process of driving to pass through a tunnel), the terminals will re-search for a network. If the terminals cannot register on the network for a long time when re-searching for the network, a bad user experience will be brought.

SUMMARY

The embodiments of the present disclosure provide a network access method, a terminal and a non-transitory processor-readable storage medium, capable of speeding up network search of a terminal so as to improve user communication experience.

According to a first aspect of the present disclosure, a network access method is provided. A terminal scans frequency points to perform network search. The scanned frequency points are added to a first pre-set list. If the terminal fails in registration under a current PLMN, the frequency points stored in the first pre-set list are searched in a next PLMN registration process so as to perform network registration.

According to a second aspect of the present disclosure, a terminal is disclosed. The terminal includes a processor and a memory having stored therein instructions which, when executed, cause the processor to implement the operations of scanning frequency points when it is detected that the terminal performs network search, adding the scanned frequency points to a first pre-set list, and searching for, if the terminal fails in registration under a current PLMN, the frequency points stored in the first pre-set list in a next PLMN registration process so as to perform network registration.

According to a third aspect of the present disclosure, there is provided a storage medium, having stored therein processor-readable instructions which, when executed, cause a processor to implement the abovementioned method for network access.

In the embodiments of the present disclosure, a terminal scans frequency points to perform network search, adds the scanned frequency points to a first pre-set list, and searches for, if the terminal fails in registration under a current PLMN, the frequency points stored in the first pre-set list in a next PLMN registration process so as to perform network registration. It can thus be seen that by means of the technical solutions provided in the present disclosure, the network search of a terminal can be speeded up and the user communication experience is improved.

BRIEF DESCRIPTION OF DRAWINGS

In order to more clearly illustrate the technical solution in the embodiments of the present disclosure, accompanying drawings used in the description of the embodiments will be simply introduced below. Clearly, the drawings described below are merely some examples of the present disclosure. Without making creative works, a person skilled in the art may also obtain other drawings according to these drawings.

DETAILED DESCRIPTION

The technical solutions in the embodiments of the present disclosure will be clearly and completely described below in conjunction with the drawings in the embodiments of the present disclosure. Clearly, the described embodiments are only a part of embodiments of the present disclosure, rather than all of the embodiments. Based on the embodiments of the present disclosure, all of other embodiments, obtained by a person skilled in the art without making creative works, fall within the scope of protection of the present disclosure.

In the current network search process of a terminal, the terminal performs system scan. Specifically, the terminal scans frequency points registered previously (the frequency points registered previously were added to a database). If the system scan does not succeed, band scan will be performed in order to scan supported bands. The above operations are repeated until a frequency point accessible to Public Land Mobile Network (PLMN) is found. Thus, a boot network search process will become slow.

The embodiments of the present disclosure disclose a network access method and a terminal, capable of speeding up network search of a terminal so as to improve the user communication experience.

Figure 1:
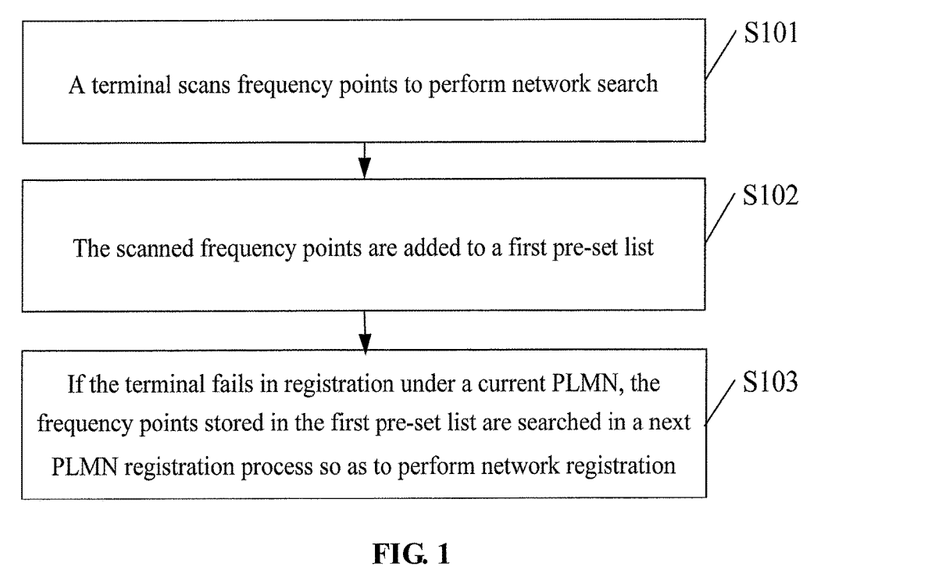
FIG. 1 is a flowchart showing a network access method according to an embodiment of the present disclosure.

FIG. 1 illustrates a network access method according to an embodiment of the present disclosure. The method as shown in FIG. 1 can be applied to a terminal such as a smart phone (Android phone or iOS phone), a tablet computer and a wearable device. As shown in FIG. 1, the network access method may include the operations as follows.

At block S101, a terminal scans frequency points to perform network search.

For example, a mobile phone needs to perform network search when moving from a network-coverless region to a network-covered region. When performing network search, the mobile phone searches for frequency points stored in a historical registration list. The historical registration list includes registered frequency points. In case of failure in searching for the frequency points stored in the historical registration list, frequency points are scanned.

Herein, it is important to note that the historical registration list includes frequency points that have been registered such as frequency points registered previously.

Herein, it is important to note that TD-LTE bands are given to respective operators as follows. China Mobile has 1880-1900 MHz, 2320-2370 MHz and 2575-2635 MHz. China Unicom has 2300-2320 MHz and 2555-2575 MHz. China Telecom has 2370-2390 MHz and 2635-2655 MHz.

Herein, BAND represents frequency bands. BAND38 refers to 2570-2620 MHz. BAND39 refers to 1880-1920 MHz. BAND40 refers to 2300-2400 MHz. BAND41 refers to 2496-2690 MHz. BAND41 contains original BAND38. That is to say, China Mobile (130 MHz spectrum) has 1880-1900 MHz, 2320-2370 MHz and 2575-2635 MHz. Bands 38, 39 and 40 are occupied. China Unicorn (40 MHz spectrum) has 2300-2320 MHz and 2555-2575 MHz. Bands 40 and 41 are occupied. China Telecom (40 MHz spectrum) has 2370-2390 MHz and 2635-2655 MHz. Bands 40 and 41 are occupied.

Herein, it is important to note that each band includes multiple frequency points. For example, for a Global System for Mobile Communication (GSM) 900 (a working band is 890-960 MHz), a frequency interval is 200 KHz. Thus, 125 wireless frequency bands namely 890 MHz, 890.2 MHz, 890.4 MHz, 890.6 MHz, 890.8 MHz, 891 MHz, . . . , 915 MHz are formed according to the frequency interval of 200 KHz, and are numbered as 1, 2, 3, 4, . . . , 125. The number for a fixed frequency is a frequency point as mentioned. On the contrary, frequency points are numbers for the fixed frequencies. In a GSM network, a frequency is replaced with a frequency point for specifying the transmitting frequency of a transceiver group. For example, a frequency point of a carrier is specified as 3, that is to say, the carrier will receive an uplink signal of which the frequency is 890.4 MHz, and transmit a signal with the frequency of 935.4 MHz. Herein, bands of GSM900 may be divided into 125 frequency points (actually, 124 frequency points are available), where frequency points 1 to 95 belong to China Mobile, and frequency points 96 to 124 belong to China Unicom.

At block S102, the scanned frequency points are added to a first pre-set list.

Herein, it is important to note that the scanned frequency points may be frequency points of China Mobile, or may be frequency points of China Unicom or China Telecom.

At block S103, if the terminal fails in registration under a current PLMN, the frequency points stored in the first pre-set list are searched in a next PLMN registration process so as to perform network registration.

Herein, it is important to note that a PLMN is a network that is established and operated by a government or an operator approved by the government for purpose of providing public land mobile communication service. The network is interconnected with a public exchange telephone network usually to form a communication network on the whole region or country scale. An identity of the PLMN is usually a series of digital codes. For example, a network identity of a PLMN of China Mobile is 46000 and a network identity of a PLMN of China Unicorn is 46001. Users can conveniently and rapidly communicate through a mobile network provided by respective operators.

For example, a current PLMN corresponding to the terminal is China Mobile, and a next PLMN is China Unicorn correspondingly. So if the terminal fails in registration under a network of China Mobile, the frequency points stored in the first pre-set list are searched in a network registration process of China Unicorn so as to perform network registration.

Alternatively, if network registration succeeds, successfully-registered frequency points are added to the historical registration list.

In addition, it can be understood that before adding the successfully-registered frequency points to the historical registration list, the method further includes the operations of acquiring a current geographic position of the terminal and establishing a mapping relation between the geographic position and the frequency points. The operation of adding the successfully-registered frequency points to the historical registration list includes storing the mapping relation between the geographic position and the frequency points to the historical registration list. It is important to note that the terminal may subsequently determine a frequency point corresponding to current position information according to current position information and a mapping relation, and may access the network through the frequency point.

For example, the terminal can be connected to a Wireless Fidelity (Wi-Fi) and can acquire current position information through the Wi-Fi. However, a Subscriber Identification Module (SIM) card is not inserted into the terminal. When an SIM card is inserted into the terminal, the frequency point corresponding to the current position information can be determined according to the current position information acquired through the Wi-Fi and the mapping relation, and then the network is accessed through the frequency point.

In addition, it is important to note that after searching for the frequency points stored in the first pre-set list so as to perform network registration, the method further includes the operations of scanning frequency points if network registration fails, adding scanned frequency points to a second pre-set list and if the terminal fails in registration under the next PLMN, performing network search in a subsequent PLMN registration process according to the frequency points recorded in the second pre-set list and the historical registration list.

It can be understood that the next PLMN is China Unicorn and a subsequent PLMN may be China Telecom.

In some feasible implementation manners, a network type described in the embodiments of the present disclosure may include Code Division Multiple Access (CDMA) 1×800 MHZ bands occupied by a mobile phone in a CDMA network mode, 900/1800/1900 MHZ bands occupied by a mobile phone in a GSM network mode, 900/1800 MHZ bands occupied by GSM1× dual-mode (i.e., Wideband Code Division Multiple Access (WCDMA)) in recent two years, 900/1800/1900/2100 MHZ bands occupied by a mobile phone in a 3G mobile communication technology network mode and 1920-2170 MHZ bands occupied by a mobile phone in a 4G mobile communication technology network mode, which will not be limited herein.

It can thus be seen that in the embodiments of the present disclosure, a terminal scans frequency points to perform network search, adds the scanned frequency points to a first pre-set list, and searches for, if the terminal fails in registration under a current PLMN, the frequency points stored in the first pre-set list in a next PLMN registration process so as to perform network registration. It can thus be seen that by means of the technical solutions provided in the present disclosure, the network search of a terminal can be speeded up and the user communication experience is improved.

Figure 2:
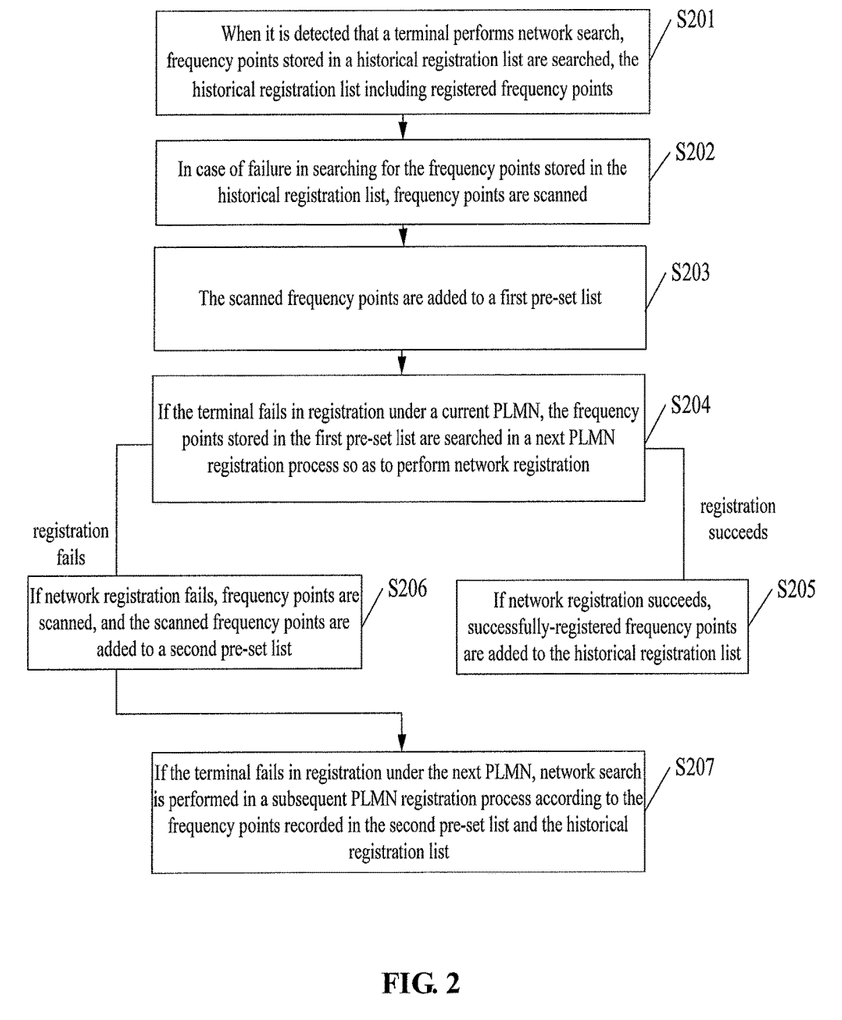
FIG. 2 is a flowchart showing another network access method according to an embodiment of the present disclosure.

FIG. 2 illustrates another network access method according to an embodiment of the present disclosure. As shown in FIG. 2, the network access method may include the operations as follows.

At block S201, when it is detected that a terminal performs network search, frequency points stored in a historical registration list are searched, the historical registration list including registered frequency points.

Herein, it can be understood that the frequency points stored in the historical registration list may be frequency points stored within a pre-set time period. The pre-set time period may be defaulted by a system or may be set by a user. The pre-set time period is, for example, three months, one month or even one week or one day. The terminal has been connected to a network through this frequency point.

At block S202, in case of failure in searching for the frequency points stored in the historical registration list, frequency points are scanned.

In this case, scan may be band scan. In the band scan process, frequency points of China Mobile may be probably scanned, frequency points of China Unicom may be probably scanned, and frequency points of China Telecom may be probably scanned.

At block S203, the scanned frequency points are added to a first pre-set list.

Herein, the first pre-set list may be stored in the terminal.

At block S204, if the terminal fails in registration under a current PLMN, the frequency points stored in the first pre-set list are searched in a next PLMN registration process so as to perform network registration.

If the current PLMN is China Unicom, the next PLMN may be China Telecom, which will not be limited herein.

At block S205, if network registration succeeds, successfully-registered frequency points are added to the historical registration list.

Herein, it can be understood that numbers of the frequency points may be stored, or frequency point information corresponding to the numbers of the frequency points may be stored. The frequency point information may be specific frequency points such as 920.2 MHz.

At block S206, if network registration fails, frequency points are scanned, and the scanned frequency points are added to a second pre-set list.

Herein, the first pre-set list and the second pre-set list are different lists.

Herein, the second pre-set list may be an updated first pre-set list, including the frequency points stored in the first pre-set list and the scanned frequency points obtained in the operation S206. In other words, in a next PLMN registration process, if network registration fails, frequency points are scanned at block S206. The scanned frequency points are added to the first pre-set list. For purpose of convenient description, the first pre-set list including the scanned frequency points is called the second pre-set list.

Further, the first pre-set list has a certain capacity and for example only stores 35 frequency points. In this case, if the first pre-set list already has 35 frequency points, part of the frequency points in the first pre-set list are replaced with the scanned frequency points obtained in the operation S206. That is, a number of frequency points in the first pre-set list will be covered by the scanned frequency points and the number of replaced frequency points is the same as the number of the scanned frequency points. The first pre-set list updated in such a manner is also called the second pre-set list.

At block S207, if the terminal fails in registration under the next PLMN, network search is performed in a subsequent PLMN registration process according to the frequency points recorded in the second pre-set list and the historical registration list.

Herein, the subsequent PLMN may be China Mobile.

It can be understood that the current terminal can support multiple SIM cards, that is to say, the current terminal supports multiple networks.

In the embodiments of the present disclosure, the operation of adding the successfully-registered frequency points to the historical registration list when network registration succeeds is expanded, so as to speed up subsequent re-search.

Figure 3:
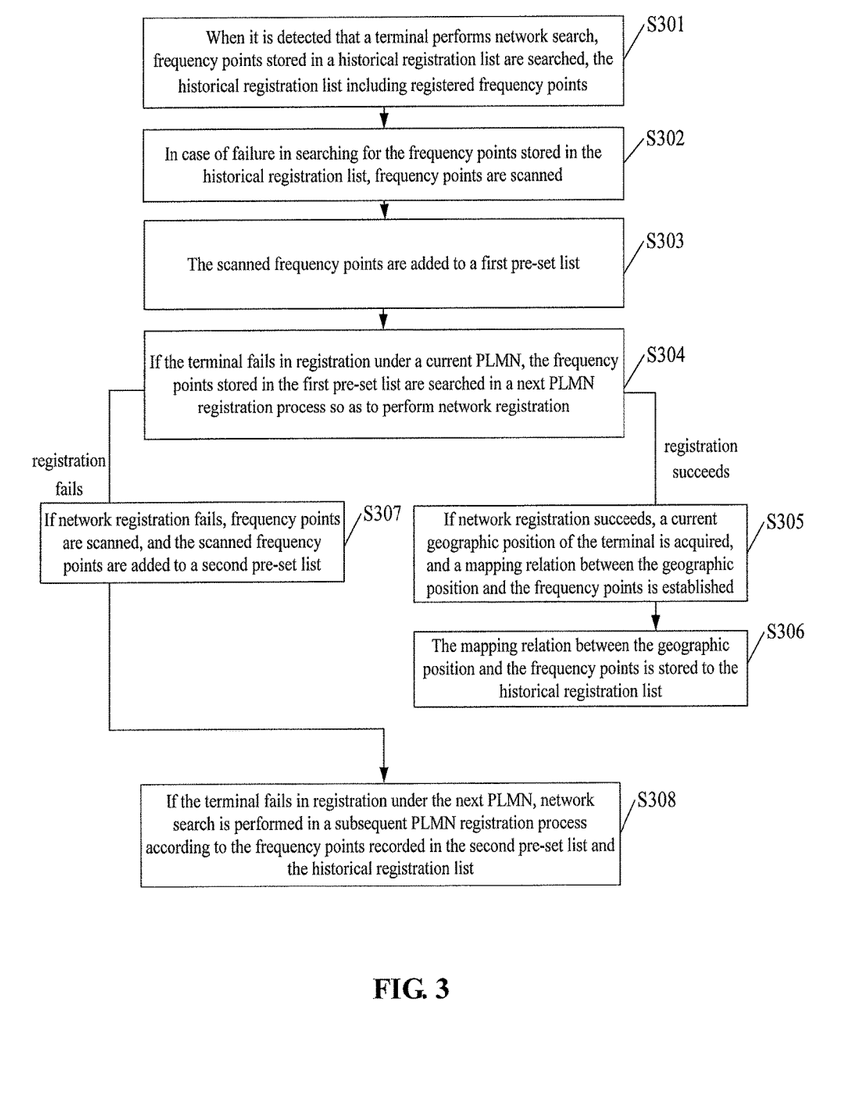
FIG. 3 is a flowchart showing another network access method according to an embodiment of the present disclosure.

FIG. 3 illustrates another network access method according to an embodiment of the present disclosure. As shown in FIG. 3, the network access method may include the operations as follows.

At block S301, when it is detected that a terminal performs network search, frequency points stored in a historical registration list are searched, the historical registration list including registered frequency points.

Herein, it can be understood that the frequency points stored in the historical registration list may be frequency points stored within a pre-set time period. The pre-set time period may be defaulted by a system or may be set by a user. The pre-set time period is, for example, three months, one month or even one week or one day. The terminal has ever been connected to a network through these frequency points.

At block S302, in case of failure in searching for the frequency points stored in the historical registration list, frequency points are scanned.

In this case, scan may be band scan. In the band scan process, frequency points of China Mobile may be probably scanned, frequency points of China Unicom may be probably scanned, and frequency points of China Telecom may be probably scanned.

At block S303, the scanned frequency points are added to a first pre-set list.

At block S304, if the terminal fails in registration under a current PLMN, the frequency points stored in the first pre-set list are searched in a next PLMN registration process so as to perform network registration.

If the current PLMN is China Unicom, the next PLMN may be China Telecom, which will not be limited herein.

At block S305, if network registration succeeds, a current geographic position of the terminal is acquired, and a mapping relation between the geographic position and the frequency points is established.

At block S306, the mapping relation between the geographic position and the frequency points is stored to the historical registration list.

Herein, it can be understood that numbers of the frequency points may be stored, or frequency point information corresponding to the numbers of the frequency points may be stored. The frequency point information may be specific frequency points such as 920.2 MHz.

At block S307, if network registration fails, frequency points are scanned, and the scanned frequency points are added to a second pre-set list.

Herein, the second pre-set list may be an updated first pre-set list, including the frequency points stored in the first pre-set list and the scanned frequency points obtained in the operation S307. In other words, in a next PLMN registration process, if network registration fails, frequency points are scanned at block S307. The scanned frequency points are added to the first pre-set list. For purpose of convenient description, the first pre-set list including the scanned frequency points is called the second pre-set list.

Further, the first pre-set list has a certain capacity and for example only stores 35 frequency points. In this case, if the first pre-set list already has 35 frequency points, part of the frequency points in the first pre-set list are replaced with the scanned frequency points obtained in the operation S307. That is, a number of frequency points in the first pre-set list will be covered by the scanned frequency points and the number of replaced frequency points is the same as the number of the scanned frequency points. The first pre-set list updated in such a manner is also called the second pre-set list.

At block S308, if the terminal fails in registration under the next PLMN, network search is performed in a subsequent PLMN registration process according to the frequency points recorded in the second pre-set list and the historical registration list.

Herein, the subsequent PLMN may be China Mobile.

In the embodiments of the present disclosure, the operations of acquiring the current geographic position of the terminal and establishing the mapping relation between the geographic position and the frequency points when network registration succeeds are expanded, so as to facilitate subsequent acquisition of a target frequency point according to the current geographic position. Herein the target frequency point is a frequency point corresponding to the current geographic position.

Figure 4:
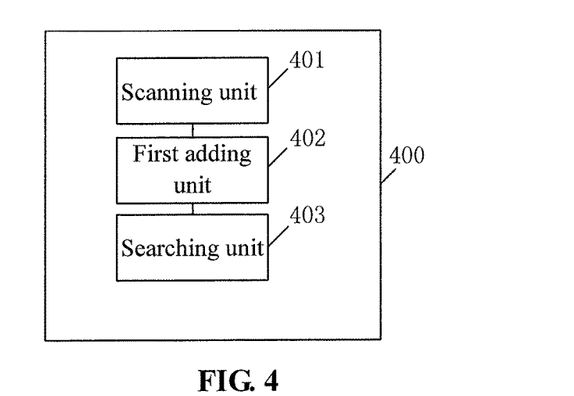
FIG. 4 is a structural diagram illustrating a terminal according to an embodiment of the present disclosure.

FIG. 4 illustrates a terminal according to an embodiment of the present disclosure. As shown in FIG. 4, a terminal 400 provided according to an embodiment of the present disclosure may be an electronic device such as a smart phone, a tablet computer and a smart wearable device. The terminal 400 includes a scanning unit 401, a first adding unit 402 and a searching unit 403.

The scanning unit 401 is configured to scan, when it is detected that the terminal performs network search, frequency points.

The first adding unit 402 is configured to add the scanned frequency points to a first pre-set list.

The searching unit 403 is configured to search for, if the terminal fails in registration under a current PLMN, the frequency points stored in the first pre-set list in a next PLMN registration process so as to perform network registration.

Herein, the scanning unit 401, the first adding unit 402 and the searching unit 403 may be configured to execute the method described with reference to operations S101 to S103 in FIG. 1. Specific descriptions refer to FIG. 1, and will not be elaborated herein.

Figure 5:
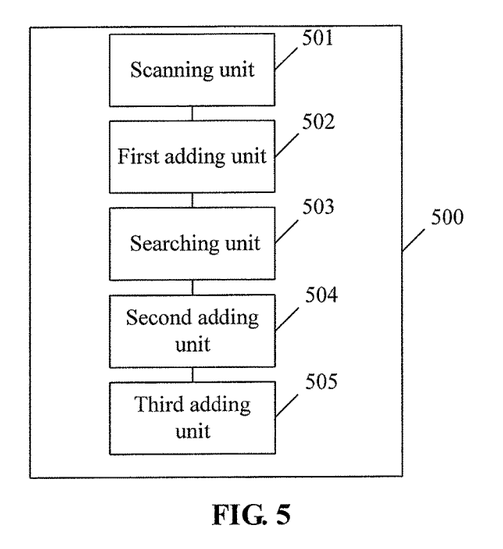
FIG. 5 is a structural diagram illustrating another terminal according to an embodiment of the present disclosure.

FIG. 5 illustrates a terminal according to an embodiment of the present disclosure. As shown in FIG. 5, another terminal 500 provided according to an embodiment of the present disclosure may be an electronic device such as a smart phone, a tablet computer and a smart wearable device. The terminal 500 includes a scanning unit 501, a first adding unit 502, a searching unit 503, a second adding unit 504 and a third adding unit 505.

The scanning unit 501 is configured to search for, when it is detected that the terminal performs network search, frequency points stored in a historical registration list, the historical registration list including registered frequency points.

The scanning unit 501 is further configured to scan, in case of failure in searching for the frequency points stored in the historical registration list, frequency points.

The first adding unit 502 is configured to add the scanned frequency points to a first pre-set list.

The searching unit 503 is configured to search for, if the terminal fails in registration under a current PLMN, the frequency points stored in the first pre-set list in a next PLMN registration process so as to perform network registration.

The second adding unit 504 is configured to add, if network registration succeeds, successfully-registered frequency points to the historical registration list.

The scanning unit 501 is further configured to scan, if network registration fails, frequency points.

The third adding unit 505 is configured to add scanned frequency points to a second pre-set list.

The searching unit 503 is configured to perform, if the terminal fails in registration under the next PLMN, network search in a subsequent PLMN registration process according to the frequency points recorded in the second pre-set list and the historical registration list.

Herein, the scanning unit 501, the first adding unit 502, the searching unit 503, the second adding unit 504 and the third adding unit 505 may be configured to execute the method described with reference to operations S201 to S207 in FIG. 2. Specific descriptions refer to FIG. 2, and will not be elaborated herein.

Figure 6:
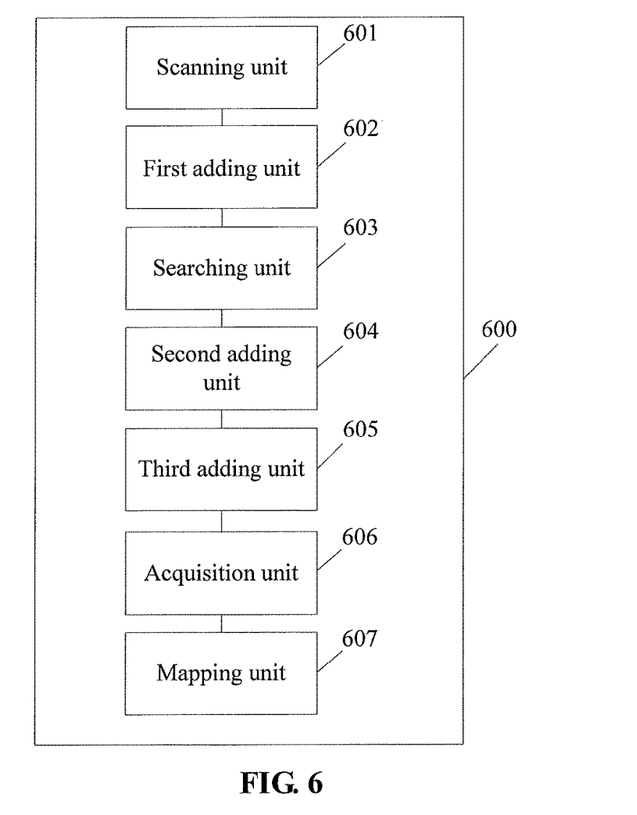
FIG. 6 is a structural diagram illustrating another terminal according to an embodiment of the present disclosure.

FIG. 6 illustrates a terminal according to an embodiment of the present disclosure. As shown in FIG. 6, another terminal 600 provided according to an embodiment of the present disclosure may be an electronic device such as a smart phone, a tablet computer and a smart wearable device. The terminal 600 includes a scanning unit 601, a first adding unit 602, a searching unit 603, a second adding unit 604, a third adding unit 605, an acquisition unit 606 and a mapping unit 607.

The scanning unit 601 is configured to search for, when it is detected that the terminal performs network search, frequency points stored in a historical registration list, the historical registration list including registered frequency points.

The scanning unit 601 is further configured to scan, in case of failure in searching for the frequency points stored in the historical registration list, frequency points.

The first adding unit 602 is configured to add the scanned frequency points to a first pre-set list.

The searching unit 603 is configured to search for, if the terminal fails in registration under a current PLMN, the frequency points stored in the first pre-set list in a next PLMN registration process so as to perform network registration.

The acquisition unit 606 is configured to acquire a current geographic position of the terminal.

The mapping unit 607 is configured to establish a mapping relation between the geographic position and the frequency points.

The second adding unit 604 is specifically configured to store the mapping relation between the geographic position and the frequency points to the historical registration list.

The scanning unit 601 is further configured to scan, if network registration fails, frequency points.

The third adding unit 605 is configured to add scanned frequency points to a second pre-set list.

The searching unit 603 is configured to perform, if the terminal fails in registration under the next PLMN, network search in a subsequent PLMN registration process according to the frequency points recorded in the second pre-set list and the historical registration list.

Herein, the scanning unit 601, the first adding unit 602, the searching unit 603, the second adding unit 604, the third adding unit 605, the acquisition unit 606 and the mapping unit 607 may be configured to execute the method described with reference to operations S301 to S308 in FIG. 3. Specific descriptions refer to FIG. 3, and will not be elaborated herein.

Figure 7:
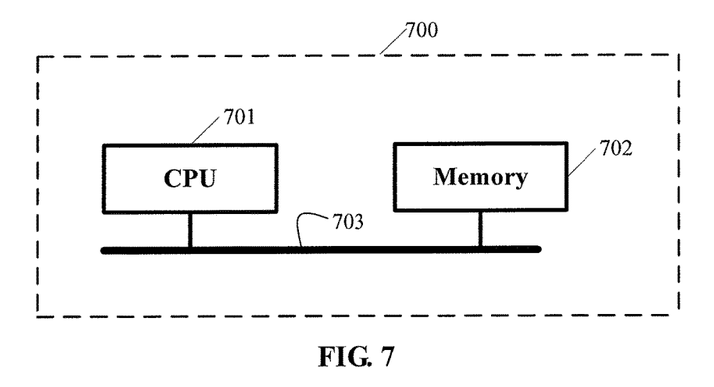
FIG. 7 is a physical structure diagram illustrating a terminal according to an embodiment of the present disclosure.

In another embodiment of the present disclosure, FIG. 7 illustrates a terminal. The terminal 700 includes a Central Processing Unit (CPU) 701, a memory 702 and a bus 703. The terminal 700 may be an electronic device such as a smart phone, a tablet computer and a smart wearable device.

The CPU 701 executes a program pre-stored in the memory 702. The execution process specifically includes the operations of scanning, by the terminal, frequency points to perform network search; adding the scanned frequency points to a first pre-set list; and if the terminal fails in registration under a current PLMN, searching for the frequency points stored in the first pre-set list in a next PLMN registration process so as to perform network registration.

In an alternative embodiment, before the operation of scanning the frequency points, the execution process further includes the operations of searching for frequency points stored in a historical registration list, the historical registration list including registered frequency points; and scanning frequency points in case of failure in searching for the frequency points stored in the historical registration list.

In an alternative embodiment, after the operation of searching for the frequency points stored in the first pre-set list so as to perform network registration, the execution process further includes the operation of adding successfully-registered frequency points to the historical registration list if network registration succeeds.

In an alternative embodiment, before the operation of adding the successfully-registered frequency points to the historical registration list, the execution process further includes the operations of acquiring a current geographic position of the terminal and establishing a mapping relation between the geographic position and the frequency points.

The operation of adding the successfully-registered frequency points to the historical registration list includes the operation of storing the mapping relation between the geographic position and the frequency points to the historical registration list.

In an alternative embodiment, after the operation of searching for the frequency points stored in the first pre-set list so as to perform network registration, the execution process further includes the operations of scanning frequency points if network registration fails, adding scanned frequency points to a second pre-set list; and if the terminal fails in registration under the next PLMN, performing network search in a subsequent PLMN registration process according to the frequency points recorded in the second pre-set list and the historical registration list.

It can be seen that in the solutions of the embodiments of the present disclosure, a terminal scans frequency points to perform network search, adds the scanned frequency points to a first pre-set list, and searches for, if the terminal fails in registration under a current PLMN, the frequency points stored in the first pre-set list in a next PLMN registration process so as to perform network registration. It can thus be seen that by means of the technical solutions provided in the present disclosure, the network search of a terminal can be speeded up, and the user communication experience is improved.

Figure 8:
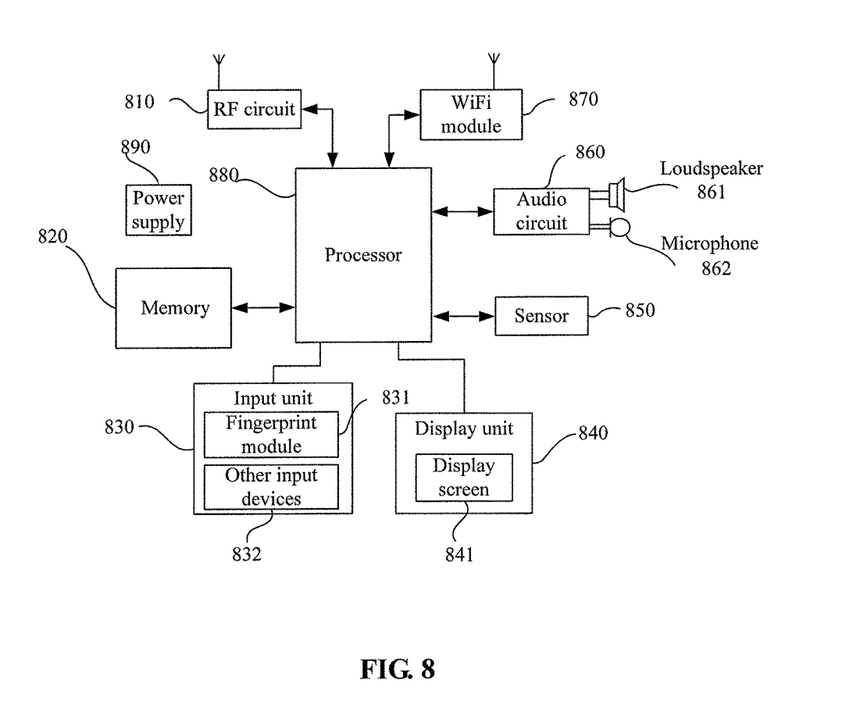
FIG. 8 is a physical structure diagram illustrating a mobile phone according to an embodiment of the present disclosure.

FIG. 8 illustrates a partial structure diagram of a mobile phone associated with a mobile terminal according to an embodiment of the present disclosure. As shown in FIG. 8, the mobile phone includes a Radio Frequency (RF) circuit 810, a memory 820, an input unit 830, a display unit 840, a sensor 850, an audio circuit 860, a Wi-Fi module 870, a processor 880, a power supply 890, and other components. A person skilled in the art may understand that a mobile phone structure shown in FIG. 8 is not limited to the mobile phone, and the mobile phone may include parts more or fewer than those shown in the figure, or combine some parts, or have different part arrangements.

Each component of the mobile phone will be specifically introduced below in conjunction with FIG. 8.

The RF circuit 810 may be configured to receive and transmit information. Usually, the RF circuit 810 includes, but is not limited to, an antenna, at least one amplifier, a transceiver, a coupler, a Low Noise Amplifier (LNA), a duplexer, etc. In addition, the RF circuit 810 may further communicate with other devices via wireless communication and a network. The wireless communication may use any one communication standard or protocol, including, but not limited to, a GSM, General Packet Radio Service (GPRS), CDMA, WCDMA, Long Term Evolution (LTE), an E-mail, Short Messaging Service (SMS), etc.

The memory 820 may be configured to store a software program and a module, and the processor 880 executes various function applications and data processing of the mobile phone by running the software program and the module stored in the memory 820. The memory 820 may mainly include a storage program region and a storage data region. The storage program region may store an operation system, an application program needed for at least one function (a network search function and a network registration function), etc. The storage data region may store data (such as a mapping relation between geographic positions and the frequency points, a frequency point list etc.) created according to use of the mobile phone. In addition, the memory 820 may include a high-speed RAM, and may further include a non-volatile memory such as a disk storage device, a flash device, or other non-volatile solid storage devices.

The input unit 830 may be configured to receive input digital or character information and generate key signal input associated with user setting and functional control of the mobile phone. Specifically, the input unit 830 may include a fingerprint module 831 and other input devices 832. The fingerprint module 831 may collect fingerprint data of a user thereon. Alternatively, the fingerprint module 831 may include an optical fingerprint module, a capacitive fingerprint module and an RF fingerprint module. By taking the capacitive fingerprint module as the fingerprint module 831, the fingerprint module 831 specifically includes induction electrodes (n1 abnormal induction electrodes and n2 normal induction electrodes) and a signal processing circuit (such as an amplification circuit, a noise suppression circuit, and an analog-to-digital conversion circuit or the like) connected to the induction electrodes. The input unit 830 may further include, in addition to the fingerprint module 831, other input devices 832. Specifically, the other input devices 832 may include, but are not limited to, one or more of a physical keyboard, a functional key (such as a volume control key and a switch key), a track ball, a mouse and an operating rod.

The display unit 840 may be configured to display information input by the user or information provided for the user or various menus of the mobile phone. The display unit 840 may include a display screen 841. Alternatively, the display screen 841 may be configured in a form of a Liquid Crystal Display (LCD), an Organic Light-Emitting Diode (OLED), etc. Although the fingerprint module 831 and the display screen 841 in FIG. 8 as two independent parts implement input and output functions of the mobile phone, the fingerprint module 831 and the display screen 841 may be integrated to implement the input and the output functions of the mobile phone in some embodiments.

The mobile phone may further include at least one sensor 850 such as a light sensor, a motion sensor and other sensors. Specifically, the light sensor may include an ambient light sensor and a proximity sensor. The ambient light sensor may adjust the luminance of the display screen 841 according to the brightness of ambient light, and the proximity sensor may close the display screen 841 and/or backlight when the mobile phone approaches to an ear of a user. As one of the motion sensors, an accelerometer sensor may detect the magnitude of an accelerated speed in each direction (generally, three-axis), the size and direction of a gravity may be detected while resting, and the accelerometer sensor may be configured to identify an application of a mobile phone gesture (e.g., horizontal and vertical screen switching, relevant games, and magnetometer gesture calibration), and vibration identification relevant functions (e.g., pedometer and knocking). Other sensors such as a gyroscope sensor, a barometer sensor, a hygrometer sensor, a thermometer sensor and an infrared sensor configurable for the mobile phone will not be elaborated herein.

The audio circuit 860, the loudspeaker 881 and the microphone 882 may provide an audio interface between the user and the mobile phone. The audio circuit 860 may transmit an electric signal converted from the received audio data to the loudspeaker 881, and the loudspeaker 881 converts the electric signal into a sound signal for output. Besides, the microphone 882 converts a collected sound signal into an electric signal. The audio circuit 860 converts the received electric signal into audio data and then outputs the audio data to the processor 880 for processing. The audio data is transmitted to another mobile phone via the RF circuit 810, or the audio data is output to the memory 820 for further processing.

WiFi belongs to a short-range wireless transmission technology. The mobile phone may assist the user in E-mail receiving and sending, webpage browsing, access to streaming media and the like by means of the WiFi module 870, and it provides a wireless wideband internet access for the user. Although FIG. 8 shows the WiFi module 870, it may be understood that the WiFi module 870 does not belong to necessary components of the mobile phone and can be totally omitted without changing the essence of the present disclosure as required.

The processor 880 is a control center of the mobile phone, and is configured to connect all parts of the whole mobile phone by utilizing various interfaces and lines, to run or execute the software program and/or the module stored in the memory 820, and to call data stored in the memory 820 to execute various functions and processing data of the mobile phone, so as to wholly monitor the mobile phone. Alternatively, the processor 880 may include one or more processing units. Preferably, the processor 880 may be integrated with an application processor and a modulation-demodulation processor. The application processor mainly processes an operation system, a user interface, an application program and the like, and the modulation-demodulation processor mainly processes wireless communication. It may be understood that the modulation-demodulation processor may not be integrated into the processor 880.

The mobile phone may further include a power supply 890 (such as a battery) for supplying power to respective components. Preferably, the power supply may be connected with the processor 880 logically via a power supply management system, so as to implement functions of charging, discharging and power consumption management by means of the power supply management system.

The mobile phone may further include a camera, a Bluetooth module and the like, which are not shown and thus will not be elaborated herein.

In the foregoing embodiments shown in FIG. 1, FIG. 2 and FIG. 3, each operation method flow may be implemented on the basis of the structure of the mobile phone.

In the foregoing embodiments shown in FIG. 4, FIG. 5 and FIG. 6, each unit function may be implemented on the basis of the structure of the mobile phone.

In the foregoing embodiments, descriptions of each embodiment are emphasized respectively, and parts which are not elaborated in a certain embodiment may refer to relevant descriptions of other embodiments.

In some embodiments provided by the present application, it should be understood that the disclosed apparatus may be implemented in another manner. For example, the apparatus embodiment described above is only schematic, and for example, division of the units is only logic function division, and other division manners may be adopted in practice. For example, multiple units or components may be combined or integrated into another system, or some characteristics may be ignored or not executed. In addition, coupling or direct coupling or communication connection between each displayed or discussed component may be indirect coupling or communication connection, implemented through some interfaces, of the device or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the present embodiment according to a practical requirement.

In addition, each function unit in each embodiment of the present disclosure may be integrated into a processing unit, each unit may also exist independently, and two or more than two units may also be integrated into a unit. The abovementioned integrated unit may be implemented in a hardware form, and may also be implemented in form of hardware and software function unit.

When being implemented in form of software function module and sold or used as an independent product, the integrated unit may also be stored in a computer-readable storage medium. Based on such an understanding, the technical solutions of the present disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the present disclosure. The abovementioned memory includes various media capable of storing program codes, such as a U disk, a Read-Only Memory (ROM), a Random Access Memory (RAM), a mobile hard disk, a magnetic disk or an optical disk.

As stated above, the above embodiments are only used to illustrate the technical solutions of the present disclosure, and not intended to limit the present disclosure. Although the present disclosure is illustrated in detail with reference to each of the above embodiments, those skilled in the art shall understand that they can still modify the technical solutions recorded by each of the above embodiments or can equivalently replace some or all of the technical features. These modifications or replacements do not make the essences of corresponding technical solutions depart from the scope of the technical solutions in each embodiment of the present disclosure.

The invention claimed is:

1. A network access method, comprising:
scanning, by a terminal, frequency points of supported bands to perform network search;
adding the scanned frequency points to a first pre-set list; and
in case that the terminal fails in registration under a current Public Land Mobile Network (PLMN), searching for the frequency points stored in the first pre-set list in a next PLMN registration process so as to perform network registration;
the method further comprising:
before scanning the frequency points of the supported bands, searching for frequency points stored in a historical registration list, the historical registration list comprising registered frequency points; and
in case of failure in searching for the frequency points stored in the historical registration list, scanning the frequency points of the supported bands.

2. The method according to claim 1, after searching for the frequency points stored in the first pre-set list so as to perform network registration, further comprising:
in case of successful network registration, adding successfully-registered frequency points to the historical registration list.

3. The method according to claim 2, before adding the successfully-registered frequency points to the historical registration list, further comprising:
acquiring a current geographic position of the terminal; and
establishing a mapping relation between the geographic position and the frequency points; and
wherein adding the successfully-registered frequency points to the historical registration list comprises:
storing the mapping relation between the geographic position and the frequency points to the historical registration list.

4. The method according to claim 1, after searching for the frequency points stored in the first pre-set list so as to perform network registration, further comprising:
in case that network registration fails, scanning frequency points of the supported bands;
adding the scanned frequency points to a second pre-set list; and
in case that the terminal fails in registration under the next PLMN, performing network search in a subsequent PLMN registration process according to the frequency points recorded in the second pre-set list and the historical registration list.

5. The method according to claim 4, wherein the operation of adding the scanned frequency points to the second pre-set list comprises:

adding the scanned frequency points to the first pre-set list so as to form the second pre-set list.

6. The method according to claim 4, wherein the operation of adding the scanned frequency points to the second pre-set list comprises:
replacing frequency points in the first pre-set list with the scanned frequency points so as to form the second pre-set list.

7. A terminal, comprising:
a processor; and
a memory for storing instructions executable by the processor;
wherein the processor is configured to:
scan frequency points of supported bands when it is detected that the terminal performs network search;
add the scanned frequency points to a first pre-set list; and
search for, in case that the terminal fails in registration under a current Public Land Mobile Network (PLMN), the frequency points stored in the first pre-set list in a next PLMN registration process so as to perform network registration;
wherein the processor is further configured to:
search for, when it is detected that the terminal performs network search, frequency points stored in a historical registration list, the historical registration list comprising registered frequency points; and
scan frequency points of the supported bands in case of failure in searching for the frequency points stored in the historical registration list.

8. The terminal according to 7, wherein the processor is further configured to add, in case that network registration succeeds, successfully-registered frequency points to the historical registration list.

9. The terminal according to claim 8, wherein the processor is further configured to:
acquire a current geographic position of the terminal;
establish a mapping relation between the geographic position and the frequency points; and
store the mapping relation between the geographic position and the frequency points to the historical registration list.

10. The terminal according to claim 7, wherein the processor is further configured to:
scan frequency points of the supported bands in case that network registration fails;
add scanned frequency points to a second pre-set list; and
perform, in case that the terminal fails in registration under the next PLMN, network search in a subsequent PLMN registration process according to the frequency points recorded in the second pre-set list and the historical registration list.

11. The terminal according to claim 10, wherein the operation of adding the scanned frequency points to the second pre-set list comprises:
adding the scanned frequency points to the first pre-set list so as to form the second pre-set list.

12. The terminal according to claim 10, wherein the operation of adding the scanned frequency points to the second pre-set list comprises:
replacing frequency points in the first pre-set list with the scanned frequency points so as to form the second pre-set list.

13. A non-transitory processor readable medium having processor readable instructions stored therein which, when executed, cause the processor to implement a network access method, the method comprising:

scanning, by a terminal, frequency points of supported bands to perform network search;

adding the scanned frequency points to a first pre-set list; and in case that the terminal fails in registration under a current Public Land Mobile Network (PLMN), searching for the frequency points stored in the first pre-set list in a next PLMN registration process so as to perform network registration;

the method further comprising:

before scanning the frequency points of the supported bands, searching for frequency points stored in a historical registration list the historical registration list comprising registered frequency points; and in case of failure in searching for the frequency points stored in the historical registration list, scanning the frequency points of the supported bands.

* * * * *